(12) United States Patent
Unquera et al.

(10) Patent No.: US 8,703,281 B2
(45) Date of Patent: Apr. 22, 2014

(54) HEAT TREATABLE COATED ARTICLE WITH BREAKER LAYER

(75) Inventors: Javier Unquera, Tudela (ES);
Guillermo Benito, Pamplona (ES);
Bernd Disteldorf, Mettlach (DE);
Muhammad Imran, Brownstown, MI (US); Anton Dietrich, Fontnas (CH)

(73) Assignees: Guardian Industries Corp., Auburn Hills, MI (US); Centre Luxembourg de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 449 days.

(21) Appl. No.: 12/929,263

(22) Filed: Jan. 11, 2011

(65) Prior Publication Data

US 2012/0177899 A1    Jul. 12, 2012

(51) Int. Cl.
*B32B 7/02*    (2006.01)

(52) U.S. Cl.
USPC .......................................... 428/212; 428/220

(58) Field of Classification Search
USPC ....................................... 428/212, 220, 411.1
See application file for complete search history.

(56) References Cited

U.S. PATENT DOCUMENTS

| | | | |
|---|---|---|---|
| 5,688,585 A | 11/1997 | Lingle et al. | |
| 6,576,349 B2 | 6/2003 | Lingle et al. | |
| 6,692,831 B2 | 2/2004 | Stachowiak | |
| 6,852,419 B2 | 2/2005 | Stachowiak | |
| 6,908,679 B2 | 6/2005 | Stachowiak et al. | |
| 6,926,967 B2 | 8/2005 | Neuman et al. | |
| 6,967,060 B2 | 11/2005 | Stachowiak | |
| 7,081,302 B2 | 7/2006 | Lemmer et al. | |
| 7,294,402 B2 | 11/2007 | Laird et al. | |
| 7,597,965 B2 | 10/2009 | Blacker et al. | |
| 7,648,769 B2 | 1/2010 | Blacker et al. | |
| 2003/0049464 A1 | 3/2003 | Glenn et al. | |
| 2003/0150711 A1 | 8/2003 | Laird | |
| 2004/0005467 A1 | 1/2004 | Neuman et al. | |
| 2004/0224167 A1* | 11/2004 | Stachowiak | 428/432 |
| 2005/0079369 A1 | 4/2005 | Stachowiak | |
| 2005/0123772 A1 | 6/2005 | Coustet et al. | |
| 2005/0196622 A1 | 9/2005 | Laird et al. | |
| 2005/0202254 A1 | 9/2005 | Nunez-Regueiro et al. | |
| 2005/0202255 A1 | 9/2005 | Lemmer et al. | |
| 2006/0046074 A1 | 3/2006 | Ferreira et al. | |
| 2006/0292381 A1* | 12/2006 | Kriltz et al. | 428/432 |

FOREIGN PATENT DOCUMENTS

| | | |
|---|---|---|
| EP | 0 747 329 | 12/1996 |
| EP | 1 630 142 | 3/2006 |
| WO | WO 2009/150343 | 12/2009 |

OTHER PUBLICATIONS

International Search Report dated Mar. 16, 2012.

* cited by examiner

*Primary Examiner* — Aaron Austin
*Assistant Examiner* — Lawrence Ferguson
(74) *Attorney, Agent, or Firm* — Nixon & Vanderhye P.C.

(57) ABSTRACT

A coated article is provided so as to include a solar control coating having an infrared (IR) reflecting layer and a breaker layer, one or both of which may be of or include a material such as NiCr, $NiCrN_x$, NbCr, $NbCrN_x$, NbZr, $NbZrN_x$, Nb and/or $NbN_x$. Each of the IR reflecting layer and the breaker layer is sandwiched between at least a pair of dielectric layers of a material such as silicon nitride or the like. In certain example embodiments of this invention, the IR reflecting layer is substantially thicker than the breaker layer. Such coated articles may be used in the context of windows such as monolithic or IG windows, and may optionally be heat treated (e.g., thermally tempered) in certain instances and may be substantially thermally stable.

11 Claims, 2 Drawing Sheets

US 8,703,281 B2

HEAT TREATABLE COATED ARTICLE WITH BREAKER LAYER

This invention relates to coated articles that include an infrared (IR) reflecting layer (e.g., of or including NiCr, $NiCrN_x$, NbCr, $NbCrN_x$, NbZr, $NbZrN_x$, Nb and/or $NbN_x$) sandwiched between at least a pair of dielectric layers, and/or a method of making the same. The coated articles further include a second metallic or substantially metallic layer, sometimes referred to as a breaker layer, that may be of substantially the same material as the IR reflecting layer. The breaker layer may be of or including NiCr, $NiCrN_x$, NbCr, $NbCrN_x$, NbZr, $NbZrN_x$, Nb and/or $NbN_x$ in certain example embodiments of this invention, and one or more of the dielectric layer(s) may be of or including silicon nitride in certain example embodiments of this invention. In certain example embodiments of this invention, the IR reflecting layer is substantially thicker than the breaker layer. Such coated articles may be used in the context of monolithic windows, insulating glass (IG) window units, laminated windows, and/or other suitable applications, and may optionally be heat treated (e.g., thermally tempered) in certain instances.

BACKGROUND AND SUMMARY OF THE INVENTION

Solar control coatings having a layer stack of glass/$Si_3N_4$/NiCr/$Si_3N_4$ are known in the art, where the metallic NiCr layer is the sole infrared (IR) reflecting layer in the coating. In certain instances, the NiCr layer may be nitrided. For example, see U.S. Pat. No. 6,926,967, which is hereby incorporated herein by reference. See also U.S. Pat. No. 5,688,585.

Unfortunately, while such layer stacks with NiCr IR reflecting layers provide efficient solar control and are overall good coatings, they are lacking in terms of being able to achieve a wider palette of available colors when desired. For example, with such a coating stack, if bluish green is desired the approach is to significantly increase the bottom dielectric thickness which unfortunately results in undesirable interference effects in that particular coating.

Thus, in certain example non-limiting embodiments of this invention, it is desired to provide a layer stack for a coating that can achieve a broader range of color possibilities when desired, compared to the above-identified layer stack of glass/$Si_3N_4$/NiCr/$Si_3N_4$.

In certain example embodiments of this invention, it has surprisingly been found that by introducing a breaker layer into the bottom dielectric of the above-identified layer stack, such improvements can be achieved. In certain example embodiments of this invention, it has been found that the provision of a thin metallic, substantially metallic, or metal nitride breaker layer in the bottom dielectric of the above-identified coating provides for improved color control and/or ranges when desired, and also provides for good thermal stability (low $\Delta E^*$ value(s)) if desired.

In certain example embodiments of this invention, heat treated (HT) coated articles have a glass side reflective $\Delta E^*$ value due to heat treatment of no greater than 4.5, more preferably no greater than 4.0, even more preferably no greater than 3.5, and most preferably no greater than 3.0. For purposes of example, the heat treatment (HT) may be for at least about 5 minutes at a temperature(s) of at least about 580 degrees C., and is sufficient for thermal tempering. The term $\Delta E^*$ is known in the art and is indicative of thermal stability upon heat treatment, and is defined and explained for example in U.S. Pat. No. 6,926,967 which is incorporated herein by reference.

Coated articles may be designed to achieve various desired glass side reflective coloration in different example embodiments of this invention, including but not limited to green, bronze, grey and/or blue glass side reflective coloration if desired.

Generally speaking, certain example embodiments of this invention fulfill one or more of the above listed needs by providing coated article including a layer system supported by a glass substrate, the layer system comprising: a first dielectric layer comprising silicon nitride; a first layer comprising NiCr on the glass substrate over at least the first layer comprising silicon nitride; a second dielectric layer comprising silicon nitride on the glass substrate over at least the first layer comprising silicon nitride and the first layer comprising NiCr; a second layer comprising NiCr on the glass substrate over at least the second dielectric layer; a third dielectric layer comprising silicon nitride on the glass substrate over at least the second layer comprising NiCr; and wherein the second layer comprising NiCr is at least twice as thick as the first layer comprising NiCr.

In certain other example embodiments of this invention, there is provided a coated article including a layer system supported by a glass substrate, the layer system comprising: a first dielectric layer; a first layer comprising NiCr and/or Nb on the glass substrate over at least the first dielectric layer; a second dielectric layer on the glass substrate over at least the first dielectric layer and the first layer comprising NiCr and/or Nb; a second layer comprising NiCr and/or Nb on the glass substrate over at least the second dielectric layer; a third dielectric layer on the glass substrate over at least the second layer comprising NiCr and/or Nb; and wherein the second dielectric layer is located directly between and contacting the first and second layers comprising NiCr and/or Nb. One or more of the dielectric layers may be of or include silicon nitride in example embodiments of this invention. One or both of the layers comprising NiCr and/or Nb may be of or include one or more of NiCr, $NiCrN_x$, NbCr, $NbCrN_x$, NbZr, $NbZrN_x$, Nb and/or $NbN_x$ in certain example embodiments of this invention.

IN THE DRAWINGS

DETAILED DESCRIPTION OF CERTAIN EXAMPLE EMBODIMENTS OF THE INVENTION

Certain embodiments of this invention provide a coating or layer system that may be used in windows such as monolithic windows (e.g., vehicle, residential, and/or architectural windows), IG window units, and/or other suitable applications. Certain example embodiments of this invention provide a layer system that is characterized by color control, good possible color ranges, and/or color stability upon heat treatment. With respect to stability upon heat treatment (HT), this means a low value of $\Delta E^*$; where $\Delta$ is indicative of $a^*$, $b^*$ and $L^*$ change in view of HT such as thermal tempering, heat bending, or thermal heat strengthening, monolithically and/or in the context of dual pane environments such as IG units or laminates. In certain exemplary embodiments, the color stability with HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Figure 1:
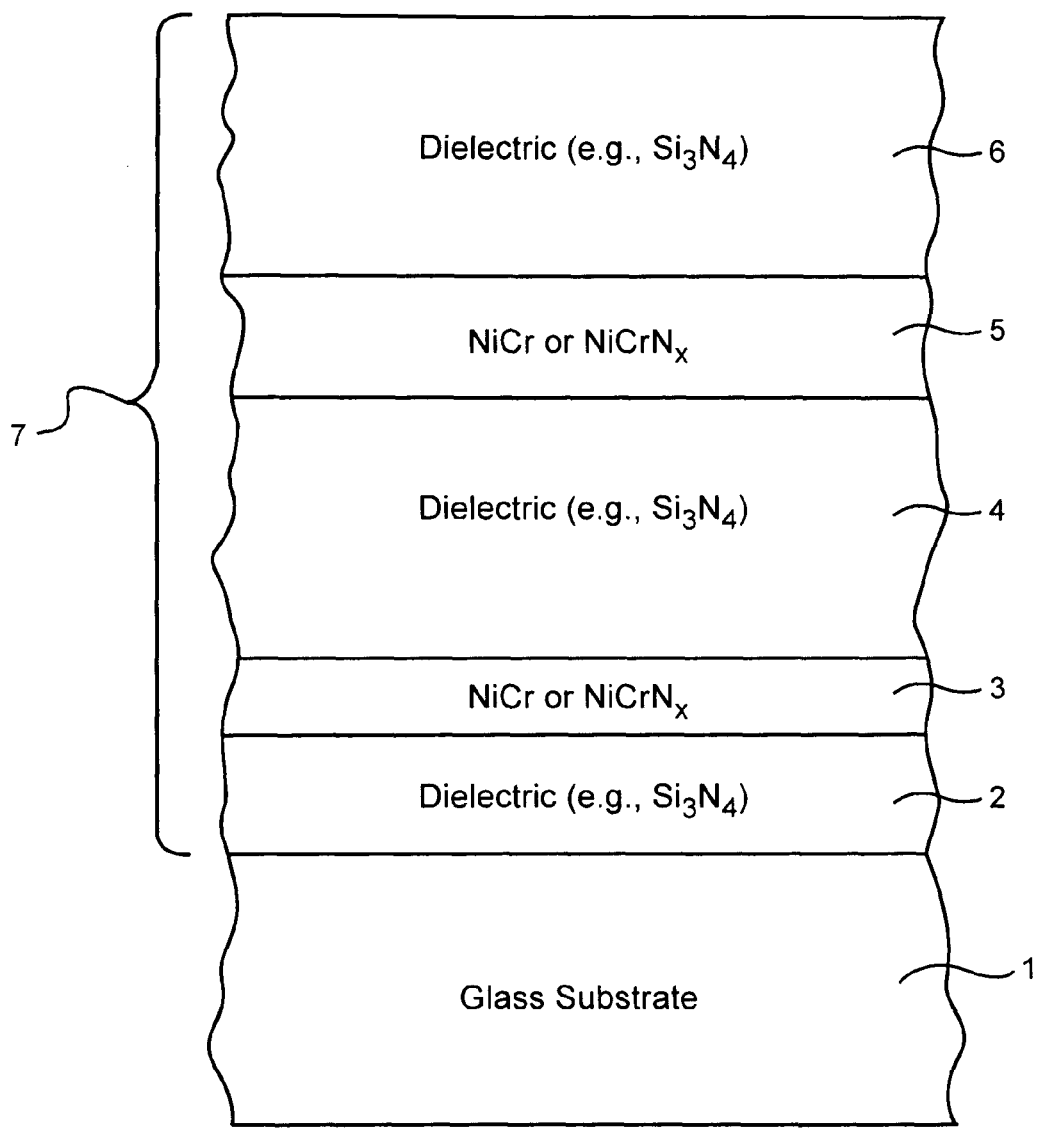
FIG. 1 is a partial cross sectional view of an embodiment of a monolithic coated article (heat treated or not heat treated) according to an example embodiment of this invention.
Figure 2:
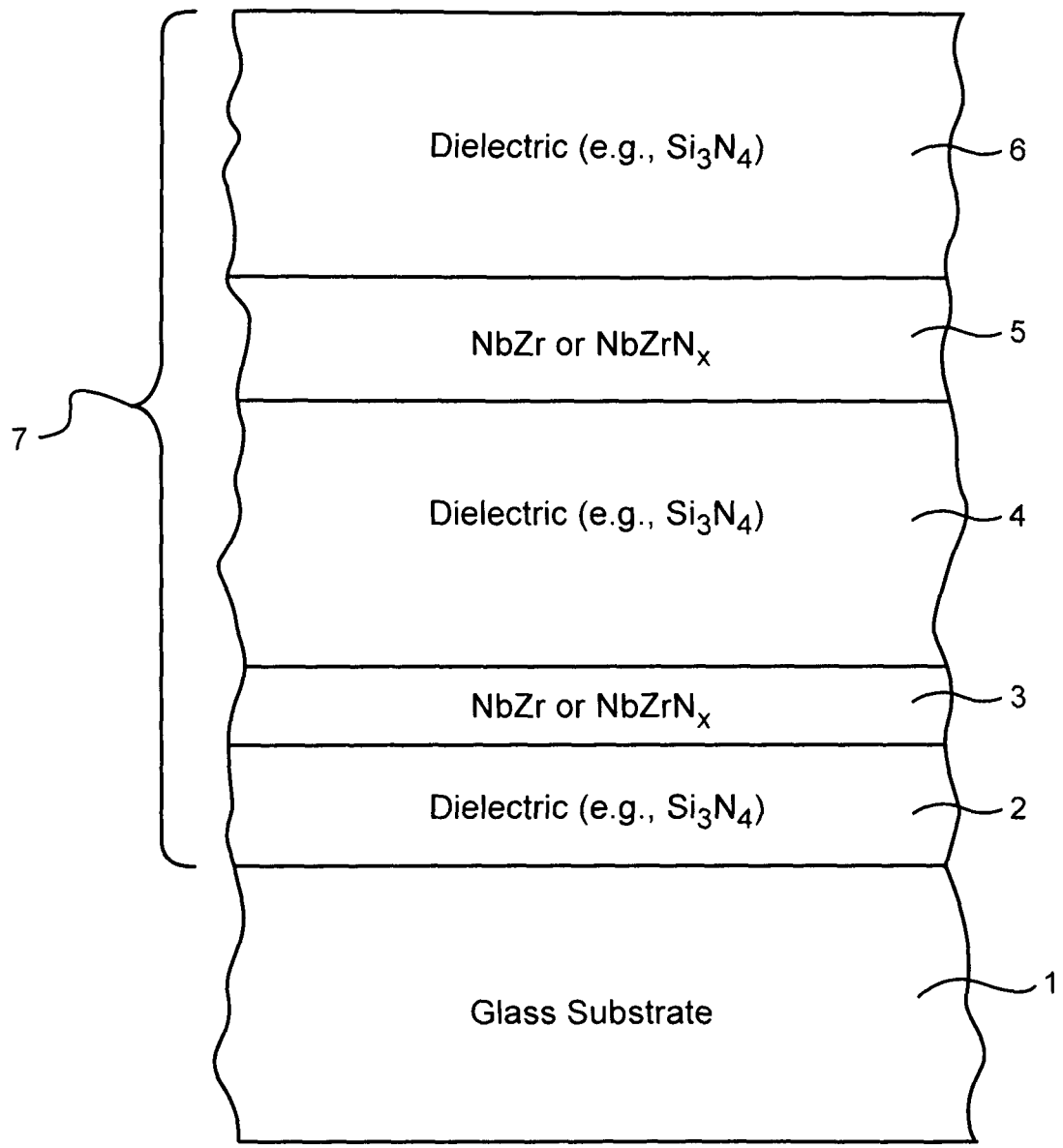
FIG. 2 is a partial cross sectional view of an embodiment of a monolithic coated article (heat treated or not heat treated) according to another example embodiment of this invention.

FIGS. 1-2 are side cross sectional views of a coated article according to example embodiments of this invention. Different example materials are show in FIGS. 1-2. Referring to FIGS. 1-2. the coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), tin oxide, or some other suitable dielectric), and breaker layer 3 of or including substantially metallic or metallic material such as NiCr, $NiCrN_x$, NbCr, $NbCrN_x$, NbZr, $NbZrN_x$, Nb and/or $NbN_x$. It will be appreciated that the breaker layer 3 is a type of absorber layer, and may optionally be nitrided in certain example embodiments of this invention. While the breaker layer 3 may include some oxygen in certain instances, it is preferable that the breaker layer 3 is substantially free of oxygen such as no more than 5% oxygen, more preferably no more than about 3% or 2% oxygen in certain embodiments. The coated article further includes dielectric layer 4 (e.g., of or including silicon nitride (e.g., $Si_3N_4$), tin oxide, or some other suitable dielectric) and infrared (IR) reflecting layer 5 of or including substantially metallic or metallic IR reflecting material such as NiCr, $NiCrN_x$, NbCr, $NbCrN_x$, NbZr, $NbZrN_x$, Nb and/or $NbN_x$. It will be appreciated that the IR reflecting layer 5 may optionally be nitrided in certain example embodiments of this invention. While the IR reflecting layer 5 may include some oxygen in certain instances, it is preferable that the layer 5 is substantially free of oxygen such as no more than 5% oxygen, more preferably no more than about 3% or 2% oxygen in certain embodiments. The coated article further includes a dielectric overcoat layer 6 of a suitable dielectric material such as one or more of silicon nitride (e.g., $Si_3N_4$), tin oxide, zirconium oxide, or some other suitable dielectric). In certain example embodiments of this invention, coating 7 does not include any metallic IR blocking or reflecting layer of or based on Ag or Au. In certain example embodiments of this invention, IR reflecting layer 5 reflects at least some IR radiation, and does not contact any other metal IR reflecting layer. In certain example embodiments, it is possible for each of the layers 2, 3, 4, 5 and 6 to include other materials such as dopants. It will be appreciated of course that other layers may also be provided, or certain layers may be omitted, and different materials may be used, in certain alternative embodiments of this invention.

In certain example embodiments, the IR reflecting layer 5 and breaker layer 3 may be of the same or substantially the same materials as indicated above. In certain example embodiments, the IR reflecting layer 5 is substantially thicker than the breaker layer 3, and thus is referred to as the IR reflecting layer whereas the thinner layer 3 is referred to as a breaker layer as it provides for color tunability and/or adjustment in certain example embodiments. The provision of the breaker layer 3 results in an improved and broader range of color possibilities and thermal stability has been observed with the addition of this layer. For example, when generally green color is desired, when the breaker layer 3 is used a desirable bluish green color from the glass side reflection is achieved, resulting in the possibility to substitute body tinted green glass with this layer stack. On the other hand, when no breaker layer 3 is present, the stack's glass side reflective color was yellow green instead of the desired bluish green. This is but one example of how the addition of the breaker layer 3 can improve color selection, tenability and/or control. Similar effects may be found for other colors such as bronze or grey in certain instances. In certain example embodiments, the absorbing/breaker layer 3 is metallic, or substantially metallic, and is provided between first and second nitride layers (e.g., silicon nitride based layers) 2 and 4 in order to reduce or prevent oxidation of layer 3 during possible heat treatment (e.g., thermal tempering, heat bending, and/or heat strengthening) thereby permitting predictable coloration to be achieved following the heat treatment at multiple viewing angles.

The overall coating 7 of FIGS. 1-2 includes at least layers 2-6. It is noted that the terms "oxide" and "nitride" as used herein include various stoichiometries. For example, the term silicon nitride includes stoichiometric $Si_3N_4$, as well as non-stoichiometric silicon nitride. Layers 2-6 may be deposited on substrate 1 via magnetron sputtering, any other type of sputtering, or via any other suitable technique in different embodiments of this invention. While FIGS. 1-2 illustrate coating 7 in a manner where IR reflecting layer 5 is in direct contact with dielectric layers 4 and 6, the instant invention is not so limited. Other layer(s) may be provided between layers 4 and 5 (and/or between layers 5 and 6) in certain other embodiments of this invention. Moreover, other layer(s) may be provided between substrate 1 and layer 2, or in other locations of the coating, in certain embodiments of this invention; and/or other layer(s) may be provided on substrate 1 over layer 4 in certain embodiments of this invention. Thus, while the coating 7 or layers thereof is/are "on" or "supported by" substrate 1 (directly or indirectly), other layer(s) may be provided therebetween. Thus, for example, the layer system 7 and layers thereof shown in FIGS. 1-2 are considered "on" the substrate 1 even when other layer(s) may be provided therebetween (i.e., the terms "on" and "supported by" as used herein are not limited to directly contacting).

In certain example embodiments of this invention, dielectric layers 2, 4 and 6 may each have an index of refraction "n" of from 1.7 to 2.7, more preferably from 1.9 to 2.5 in certain embodiments, and most preferably from about 2.0 to 2.06 in preferred embodiments of this invention. One, two or all three of these layers 2, 4, 6 may be of or include silicon nitride and/or silicon oxynitride in certain example embodiments of this invention. In such embodiments of this invention where layers 2, 4 and/or 6 comprise silicon nitride (e.g., $Si_3N_4$), sputtering targets including Si employed to form these layers may or may not be admixed with up to 1-20% (e.g., 8%) by weight aluminum or stainless steel (e.g. SS#316), with about this amount then appearing in the layers so formed. Even with this amount(s) of aluminum and/or stainless steel, such layers 2 and 4 are still considered dielectric layers.

While FIGS. 1-2 illustrate a coated article according to an embodiment of this invention in monolithic form, coated articles according to other embodiments of this invention may comprise IG (insulating glass) window units. In IG embodiments, coating 7 from FIGS. 1-2 may be provided on the inner wall of the outer substrate of the IG unit, and/or on the inner wall of the inner substrate, or in any other suitable location in other embodiments of this invention. An example IG unit may comprise a pair of spaced apart clear glass substrates each about 3-6 mm thick, one of which is coated with a coating 7 herein in certain example instances, where the gap between the substrates may be from about 5 to 30 mm, more preferably from about 10 to 20 mm, and most preferably about 16 mm. In certain example instances, the coating 7 may be provided on the interior surface of either substrate facing the gap. In certain preferred embodiment, the glass substrate 1 shown in FIG. 1 may be the outer glass substrate of an IG window unit and the coating 7 may be provided on the interior surface of the outer glass substrate 1. The gap between substrates in an IG unit may be filed with air and/or argon gas in certain example embodiments.

Turning back to FIGS. 1-2, while various thicknesses may be used consistent with one or more of the needs discussed herein. According to certain non-limiting example embodiments of this invention, example thicknesses and materials for the respective layers 2-6 on the glass substrate 1 are as follows in certain example embodiments for various desired colors:

TABLE 1

(Example non-limiting thicknesses for green colored embodiments)

| Layer | Example Range (Å) | Preferred (Å) | Best (Å) |
|---|---|---|---|
| silicon nitride (layer 2): | 50-1000 Å | 80-500 Å | 100-250 Å |
| breaker (layer 3): | 10-100 Å | 15-60 Å | 20-45 Å |
| silicon nitride (layer 4): | 100-2,000 Å | 400-1500 Å | 700-1200 Å |
| IR reflector (layer 5): | 50-400 Å | 70-300 Å | 140-220 Å |
| silicon nitride (layer 6): | 100-1,200 Å | 300-900 Å | 400-750 Å |

Table 1 above relates to, for example, embodiments where glass side reflective generally green coloration is desirable. In such embodiments, when the breaker layer 3 is used a desirable bluish green color from the glass side reflection is achieved. On the other hand, when no breaker layer 3 is present, the stack's glass side reflective color was yellow green instead of the desired bluish green. Thus, the presence of the breaker layer has been shown to unexpectedly result in improved coloration in this respect. In each of the embodiments, the thickness of the middle dielectric layer 4 allows for control over color and the degree of interference between the layers 3 and 5. In certain example embodiments, middle dielectric layer 4 is at least two times as thick as bottom dielectric layer 2, more preferably at least about three times, and more preferably at least about four or five times as thick as bottom dielectric layer 2; this allows color to be controlled in a desirable manner while at the same time allows interference between the layers 3 and 5 to be reduced. Example thickness ranges regarding other example embodiments are set forth below.

TABLE 2

(Example non-limiting thicknesses for bronze colored embodiments)

| Layer | Example Range (Å) | Preferred (Å) | Best (Å) |
|---|---|---|---|
| silicon nitride (layer 2): | 50-1000 Å | 100-500 Å | 200-400 Å |
| breaker (layer 3): | 10-100 Å | 15-60 Å | 30-50 Å |
| silicon nitride (layer 4): | 70-1,000 Å | 100-500 Å | 180-320 Å |
| IR reflector (layer 5): | 50-400 Å | 70-300 Å | 140-220 Å |
| silicon nitride (layer 6): | 100-1,200 Å | 300-900 Å | 300-650 Å |

TABLE 3

(Example non-limiting thicknesses for grey colored embodiments)

| Layer | Example Range (Å) | Preferred (Å) | Best (Å) |
|---|---|---|---|
| silicon nitride (layer 2): | 50-1000 Å | 100-500 Å | 200-400 Å |
| breaker (layer 3): | 20-200 Å | 50-150 Å | 70-115 Å |
| silicon nitride (layer 4): | 70-1,000 Å | 80-300 Å | 100-200 |
| IR reflector (layer 5): | 30-300 Å | 50-200 Å | 80-120 Å |
| silicon nitride (layer 6): | 100-1,200 Å | 300-900 Å | 400-600 Å |

In certain exemplary embodiments, the color stability with HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

Before any optional heat treatment (HT) such as thermal tempering, in certain example embodiments of this invention coated articles have color characteristics as follows in Tables 4 and 6 (monolithic and/or IG unit). It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 7 is provided. Table 5 set forth below illustrates certain characteristics of coated articles according to certain example embodiments of this invention after HT such as thermal tempering (monolithic and/or IG units) for all colors—the characteristics below in Table 4 (non-HT) are also applicable to HT coated articles herein, except for the additions set forth in Table 5. Table 4 relates to green colored embodiments (see also Table 1 above), and Table 6 relates to bronze colored embodiments. Ill. C, 2 degree observer, was used. Sheet resistance, in units of ohms/square, is also provided below in Tables 4 and 6.

TABLE 4

Color/Optical Characteristics (non-HT in green colored embodiments)

| | General | Preferred | Most Preferred |
|---|---|---|---|
| $T_{vis}$ (TY): | 8-50% | 10-32% | 15-30% |

TABLE 4-continued

Color/Optical Characteristics (non-HT in green colored embodiments)

|  | General | Preferred | Most Preferred |
|---|---|---|---|
| $L^*_T$ | 34-92 | 37-76 | 41-62 |
| $a^*_T$ | −9 to +4 | −7 to 0 | −5 to −1.5 |
| $b^*_T$ | −2 to +12 | 0 to +10 | +3 to +8 |
| $R_G Y$(glass side): | 8-50% | 10-45% | 30-40% |
| $L^*_G$ | 34-76 | 40-80 | 60-72 |
| $a^*_G$ | −30 to −8 | −22 to −10 | −20 to −13 |
| $b^*_G$ | −15 to +2 | −9 to 0 | −7 to −1 |
| $R_s$ (Ω/sq): | <140 | <100 | 40-75 |

TABLE 5

Color/Optical Characteristics (after HT; in addition to Table 2)

|  | General | Preferred | Most Preferred |
|---|---|---|---|
| $\Delta E^*_G$ | <=4.0 | <=3.0 | <=2.5 |

TABLE 6

Color/Optical Characteristics (non-HT in bronze colored embodiments)

|  | General | Preferred | Most Preferred |
|---|---|---|---|
| $T_{vis}$ (TY): | 8-50% | 10-32% | 15-30% |
| $L^*_T$ | 34-92 | 37-76 | 41-62 |
| $a^*_T$ | −9 to +4 | −7 to 0 | −5 to −1.5 |
| $b^*_T$ | −4 to +12 | −2 to +8 | 0 to +3 |
| $R_G Y$(glass side): | 8-50% | 10-30% | 12-20% |
| $L^*_G$ | 30-76 | 35-60 | 40-52 |
| $a^*_G$ | −1 to +7 | 0 to +5 | +1 to +3 |
| $b^*_G$ | 0 to +11 | +1 to +9 | +3 to +6 |
| $R_s$ (Ω/sq): | <140 | <100 | 40-75 |

The heat treated optical values (e.g., a*, b*, transmission) are similar to those set forth above, in view of the low glass side reflective ΔE* values ($\Delta E^*_G$) achieved in connection with certain example embodiments of this invention.

For purposes of example only, a plurality of examples representing different example embodiments of this invention are set forth below.

EXAMPLES

Examples 1-5 were monolithic coated articles, with the layer stack as shown in FIG. 1. The silicon nitride layers 2, 4 and 6 in each example were deposited by sputtering a silicon target (doped with about 8% Al) in an atmosphere including nitrogen gas. The NiCrN$_x$ layers 3 and 5 in each example was deposited by sputtering approximately 80/20 Ni/Cr in an atmosphere including argon and nitrogen gas (e.g., about 10 ml/kW nitrogen gas flow). Examples 1-3 were simulations, whereas Examples 4-5 were for actual products having layer thicknesses similar to the simulations of Examples 1-2 respectively. Layer thicknesses were in angstroms. Examples 1 and 4 were for glass-side reflective green colored products, Examples 2 and 5 were for glass-side reflective bronze colored products, and Example 3 was for a glass-side reflective grey colored product.

EXAMPLES

| Layer | Ex. 1 | Ex. 2 | Ex. 3 | Ex. 4 | Ex. 5 |
|---|---|---|---|---|---|
| silicon nitride (layer 2): | 153 Å | 305 Å | 320 Å | 153 Å | 305 Å |
| NiCrN$_x$ breaker (layer 3): | 32 Å | 41 Å | 93 Å | 32 Å | 41 Å |
| silicon nitride (layer 4): | 1044 Å | 239 Å | 150 Å | 1044 Å | 239 Å |
| NiCrN$_x$ IR reflector (layer 5): | 184 Å | 171 Å | 100 Å | 184 Å | 171 Å |
| silicon nitride (layer 6): | 582 Å | 431 Å | 500 Å | 582 Å | 431 Å |

Measured monolithically, Examples 1 and 4-5 had the following characteristics (annealed and non-HT, monolithic) (Ill. C, 2 degree observer).

| Parameter | Ex. 1 (Green) | Ex. 4 (Green) | Ex. 5 (Bronze) |
|---|---|---|---|
| $T_{vis}$ (TY)(transmissive): | 21.76% | 21.07% | 22.54% |
| $a^*_T$ | −3.9 | −2.82 | −3.66 |
| $b^*_T$ | 8.05 | 5.01 | 0.34 |
| $R_G Y$(glass side refl. %): | 36% | 36.87% | 15.82% |
| $a^*_G$: | −17.8 | −15.95 | 2.22 |
| $b^*_G$: | −1.08 | −6.62 | 4.74 |

The glass substrates were clear and about 4 or 6 mm thick in each Example. A Comparative Example (CE) was used for purposes of comparison. The Comparative Example (CE) was the same as Examples 1 and 4 except that the breaker layer 3 was omitted. The CE was characterized as follows:

COMPARATIVE EXAMPLE

| Parameter | CE |
|---|---|
| $T_{vis}$ (TY)(transmissive): | 21.52% |
| $a^*_T$ | 0.54 |
| $b^*_T$ | 5.18 |
| $R_G Y$(glass side refl. %): | 44% |
| $a^*_G$: | −10 |
| $b^*_G$: | 8.75 |

Comparing the Comparative Example (CE) to Examples 1 and 4, it can be seen that the omission of the breaker layer 3 resulted in the glass side reflective color turning to yellow green instead of the desired bluish green (note the highly positive glass side reflective b* value of 8.75 for the CE). It will be appreciated that the addition of the breaker layer 3 unexpectedly improved desired coloration characteristics as shown and explained above.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
   a first dielectric layer comprising silicon nitride;
   a first layer comprising NbZr on the glass substrate over at least the first dielectric layer;
   a second dielectric layer comprising silicon nitride on the glass substrate over at least the first dielectric layer and the first layer comprising NbZr;
   a second layer comprising NbZr on the glass substrate over at least the second dielectric layer;
   a third dielectric layer comprising silicon nitride on the glass substrate over at least the second layer comprising NbZr;
   wherein the second dielectric layer comprising silicon nitride is located directly between and contacting the first and second layers comprising NbZr;
   wherein the second layer comprising NbZr is an infrared (IR) reflecting layer and is at least twice as thick as the first layer comprising NbZr, and wherein the second dielectric layer comprising silicon nitride is located between the first and second layers comprising NbZr; and
   wherein the coated article has no infrared (IR) reflecting layer based on any of Ag or Au.

2. The coated article of claim 1, wherein at least one of the first and second layers comprising NbZr is nitrided.

3. The coated article of claim 1, wherein each of the first and second layers comprising NbZr are nitrided.

4. The coated article of claim 1, wherein each of the first and second layers comprising NbZr consist essentially of NbZr and/or $NbZrN_x$.

5. The coated article of claim 1, wherein the second layer comprising NbZr is at least four times as thick as the first layer comprising NbZr.

6. The coated article of claim 1, wherein the coated article is heat treated and has a $\Delta E^*$ value (glass side reflective) of no greater than 3.0 after and/or due to heat treatment.

7. The coated article of claim 1, wherein the coated article has a visible transmission of from about 15-30%.

8. The coated article of claim 1, wherein the coated article comprises an IG window unit or a monolithic window.

9. The coated article of claim 1, wherein said second dielectric layer is at least three times as thick as the first dielectric layer.

10. The coated article of claim 1, wherein the coated article has coloration characterized by: glass side reflective a* value of from −22 to −10, and glass side reflective b* value of from −9 to 0.

11. The coated article of claim 1, wherein the coated article is not heat treated.

* * * * *